United States Patent
LaPresti et al.

(10) Patent No.: US 9,920,839 B1
(45) Date of Patent: Mar. 20, 2018

(54) HYDROSTATIC MECHANICAL FACE SEAL

(71) Applicant: Westinghouse Electric Company LLC, Cranberry Township, PA (US)

(72) Inventors: Michael A. LaPresti, Pittsburgh, PA (US); Arnaud Milan, Pittsburgh, PA (US); Bruce A. Howard, Monroeville, PA (US); Michael P. Skocik, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 168 days.

(21) Appl. No.: 15/361,755

(22) Filed: Nov. 28, 2016

(51) Int. Cl.
| | |
|---|---|
| *F16J 15/34* | (2006.01) |
| *F16J 15/40* | (2006.01) |
| *F16J 15/32* | (2016.01) |
| *F16J 15/00* | (2006.01) |

(52) U.S. Cl.
CPC ............. *F16J 15/40* (2013.01); *F16J 15/002* (2013.01); *F16J 15/32* (2013.01)

(58) Field of Classification Search
CPC ...... F16J 15/34; F16J 15/3404; F16J 15/3408; F16J 15/3412; F16J 15/3428; F16J 15/40
See application file for complete search history.

(56) References Cited

U.S. PATENT DOCUMENTS

| | | | |
|---|---|---|---|
| 3,347,552 A | 10/1967 | Frisch | |
| 3,522,948 A | 8/1970 | MacCrum | |
| 3,529,838 A | 9/1970 | Singleton | |
| 3,632,117 A | 1/1972 | Villasor | |
| 3,720,222 A | 3/1973 | Andrews et al. | |
| 4,146,238 A | 3/1979 | Gaffal | |
| 4,275,891 A | 6/1981 | Boes | |
| 4,693,481 A * | 9/1987 | Quinn | F16J 15/3496 277/403 |
| 4,792,146 A | 12/1988 | Lebeck et al. | |
| 4,838,559 A * | 6/1989 | Guardiani | F16J 15/346 277/388 |
| 4,848,774 A | 7/1989 | Nyilas et al. | |
| 5,171,024 A | 12/1992 | Janocko | |

(Continued)

OTHER PUBLICATIONS

PCT/US2016/063900 International Search Report and Written Opinion, dated May 1, 2017 (Forms 220, 210, 237).

*Primary Examiner* — Gilbert Y Lee
(74) *Attorney, Agent, or Firm* — Richard J. Coldren; Westinghouse Electric Company LLC

(57) ABSTRACT

A controlled leakage, hydrostatic, mechanical seal that eliminates sources of contact friction; advantageously locating contact friction forces to be in alignment with the seal face centroid; optimizes the seal face design to achieve maximum hydrostatic film stiffness and minimum sensitivity to radial taper; eliminating unnecessary O-rings and other sources of significant force variation; utilizes a design-for-manufacture approach to design hardware that can be consistently manufactured to precise tolerances; optimizes the double delta channel seal to achieve adequate compression, minimal frictional drag force, and maximum wear resistance; eliminates sources of circumferential waviness such as bolt preload and other non-axisymmetric features; and, thermally isolates components of different materials to mitigate the deformation due to differential thermal expansion.

21 Claims, 5 Drawing Sheets

(56) References Cited

U.S. PATENT DOCUMENTS

| | | | |
|---|---|---|---|
| 7,416,224 B2 * | 8/2008 | Ott | F16L 27/082 |
| | | | 277/375 |
| 8,042,813 B2 | 10/2011 | Kung | |
| 8,356,972 B2 | 1/2013 | Howard et al. | |
| 9,206,791 B2 | 12/2015 | Hawkins et al. | |
| 9,206,812 B2 | 12/2015 | Hawkins et al. | |
| 9,217,441 B2 | 12/2015 | Conrad et al. | |
| 2015/0198172 A1 | 7/2015 | Hermmen, Jr. et al. | |

* cited by examiner

HYDROSTATIC MECHANICAL FACE SEAL

BACKGROUND

1. Field

This invention pertains generally to rotary shaft seals and, more particularly, to a controlled leakage mechanical face seal.

2. Related Art

In pressurized water nuclear power plants a reactor coolant system is used to transport heat from the reactor core to steam generators for the production of steam. The steam is then used to drive a turbine generator for the production of useful work. The reactor coolant system includes a plurality of separate cooling loops, each connected to the reactor core and containing a steam generator and a reactor coolant pump.

The reactor coolant pump typically is a vertical, single stage, centrifugal pump designed to move large volumes of reactor coolant at high temperatures and pressures, for example, 550° F. (288° C.) and at pressures of approximately 2,250 psia (155 bar). The pump basically includes three general sections from bottom to top; hydraulic, shaft seal and motor sections. The lower hydraulic section includes an impeller mounted on a lower end of the pump shaft which is operable within the pump casing to pump reactor coolant about the respective loop. The upper motor section includes a motor which is coupled to drive the pump shaft. The middle shaft seal section includes three tandem seal assemblies; lower primary (number 1 seal), middle secondary, and upper tertiary seal assemblies. The seal assemblies are located concentric to, and near the top end of, the pump shaft and their combined purpose is to provide for minimal reactor coolant leakage along the pump shaft to the containment atmosphere during normal operating conditions. Representative examples of pump shaft seal assemblies known in the prior art are described in U.S. Pat. Nos. 3,522,948; 3,529,838; 3,632,117; 3,720,222 and 4,275,891.

The pump shaft seal assemblies which mechanically seal the interface between the stationary pump pressure boundary and the rotating shaft, must be capable of containing the high system pressure (approximately 2,250 psi (155 bar)) without excessive leakage. In one commercial design a tandem arrangement of three seal assemblies is used to break down the pressure in stages. These three mechanical pump seal assemblies are controlled leakage seals which in operation, allow a minimal amount of controlled leakage at each stage while preventing excessive leakage of the reactor coolant from the primary coolant system to the respective seal leakoff ports.

Commercial pressurized water reactors often employ hydrostatic mechanical face seals for the controlled leakage seals between the motor and hydraulic sections of the reactor coolant pumps. Such seals are designed to permit a controlled and stable volume of leakage from the primary system while experiencing minimal wear by maintaining constant separation by a thin fluid film between the seal faces. Leakage through the seal is dependent upon the face geometry and mechanical design as well as the thermodynamic state of the sealed fluid. Nuclear reactor plant operators seek to maintain a nominal volumetric leakage rate of three gallons per minute through the reactor coolant pump seals. This amount of leakage is large enough to provide for adequate buffer/cooling water flow through the upper internals of the pump; however, it is small enough to be compensated for by the chemical and volume control system such that reactor coolant system inventory remains in an equilibrium state.

The volumetric leakage rate through the seal is determined principally by the as-manufactured dimensions of the seal's components, contact friction forces at the interfaces of adjoining components, and mechanical and thermoelastic deformation resulting from the operating temperature and pressure of the sealed fluid. Since plant operators desire to maintain a stable leakage rate through the reactor coolant pump seal, it is necessary for the design of the seal to be optimized such that manufacturing tolerances, contact friction forces, and mechanical and thermoelastic deformation exert the minimum possible influence on the seal leakage rate.

SUMMARY

In general, this invention contemplates a controlled leakage mechanical face seal having a first seal support ring configured to be secured to a rotating shaft of a pump to rotate with the rotating shaft, the shaft having an axial length, and a first face plate supported on one side of the first seal support ring and having a sealing surface on an opposite side of the first face plate. The hydrostatic mechanical face seal also has a second seal support ring configured to be secured to an inside of a housing surrounding the rotating shaft, with a degree of axial movement and a second face plate supported on one side of the second seal support ring and having a second sealing surface on an opposite side of the second face plate, wherein the second sealing surface is positioned juxtaposed to the first sealing surface. A first interface between the first seal support ring and the first face plate and a second interface between the second seal support ring and the second face plate are configured so that during operation of the pump the hydrostatic forces on the first sealing surface and the second sealing surface are sufficient to hold the first face plate against the first seal support ring and the second face plate against the second seal support ring with a controlled leakage path therebetween, without any mechanical force.

In one embodiment, this invention provides for a pump having a rotatable shaft with an axial length and a housing having an annular interior wall that surrounds and is spaced from at least a portion of the axial length of the rotatable shaft. A first seal support ring having a face on either side, is fixedly attached to, extends around and is rotatable with the rotatable shaft. The first seal support ring has an axially extending first boss on one face at or proximate a radial inner end, adjacent the rotatable shaft, and an axially extending, annular shroud at or proximate an outer end of the one face of the first seal support ring. A lip at or near a peripheral axial end of the first seal support ring shroud extends toward the rotatable shaft. An annular, first recess in the one face of the first seal support ring extends between the first boss and the first seal support ring shroud. A first face plate is supported at one end, opposing the one face on the first seal support ring, on at least a portion of the first boss, spaced from the rotatable shaft. The first face plate has a radially extending ledge on an outer side that fits under the lip on the first seal support ring shroud, with a first land on either an inner wall on the shroud of the first seal support ring or the outer side of the first face plate, below and spaced from the lip, that forms a standoff between the shroud on the first seal ring and the first face plate. The first face plate has another end, axially opposite the one end that forms a first sealing surface, with the first sealing surface extending axially past the lip on the first seal support ring shroud and the first face plate extends around and is rotatable with the rotatable shaft. A second seal support ring having a face on either side is secured to an interior of the housing with a degree of freedom of axial movement and is spaced from and extends at least partially around the rotatable shaft. The second seal support ring has an axially extending second boss on one face at or proximate a radial inner end adjacent the rotatable shaft, and an axially extending, annular shroud at or proximate an outer end of the one face of the second seal support ring with a lip at or near a peripheral axial end of the second seal support ring shroud extending toward the rotatable shaft. A second annular recess in the one face of the second seal support ring extends between the second boss and the second seal support ring shroud. A second face plate is supported at one end, opposite the one face on the second seal support ring, on at least a portion of the second boss and is spaced from the rotatable shaft, with the one end of the second face plate substantially spanning the second recess and having a radially extending ledge on an outer side of the second face plate that fits under the lip on the second seal support ring shroud. A second land on either an inner wall on the shroud of the second seal support ring or the outer side of the second face plate, below and spaced from the lip on the second seal support ring shroud, forms a standoff between the shroud on the second seal support ring and the second face plate. The second face plate has another end, axially opposite the second seal support ring, that forms a second sealing surface, with the second sealing surface extending axially past the lip on the shroud of the second seal support ring, juxtaposed to the first sealing surface and the second face plate extends substantially around and is spaced from the rotatable shaft.

In one such embodiment at least one of the first sealing surface and the second sealing surface is configured to have a contoured surface that is axis-symmetric but non-uniform in a radial direction to create a nonlinear pressure distribution between the first sealing surface and the second sealing surface. Preferably, the second face plate has the second sealing surface with the contoured surface that is axis-symmetric but non-uniform in a radial direction to create a nonlinear pressure distribution between the first sealing surface and the second sealing surface.

In another embodiment the at least one of the first sealing surface and the second sealing surface is a tapered surface that yields a convergent angle between the first sealing surface and the second sealing surface with the largest axial clearance at the outside diameter and the smallest axial clearance at the inside diameter. In one such embodiment the at least one of the first sealing surface and the second sealing surface has a stepped or non-uniform texture surface.

In another such embodiment, that while the radially extending ledge on the first face plate fits under the lip on the first seal support ring shroud, during operation of the pump the first seal support ring and the first face plate are configured so substantially no mechanical force is applied to the first face plate to hold the first face plate against the first seal support ring and during pump operation the radially extending ledge does not contact the lip on the first seal support ring shroud. Preferably, in such an embodiment, the pump includes one or both of a first O-ring around an outside surface of the first boss at an interface of the first boss with the one end of the first face plate and a second O-ring around an outside surface of the second boss at an interface of the second boss with the one end of the second face plate. Desirably, the first seal support ring comprises a first groove that surrounds the rotatable shaft and a third O-ring surrounds the rotatable shaft within the first groove and forms a seal between the first seal support ring and the rotatable shaft; and the second seal support ring comprises a second groove that surrounds a portion of the housing adjacent the rotatable shaft and a fourth O-ring surrounds the portion of the housing, within the second groove, between the second seal support ring and the portion of the housing and forms a seal between the second seal support ring and the portion of the housing.

The invention also contemplates a hydrostatic mechanical face seal having the foregoing properties.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
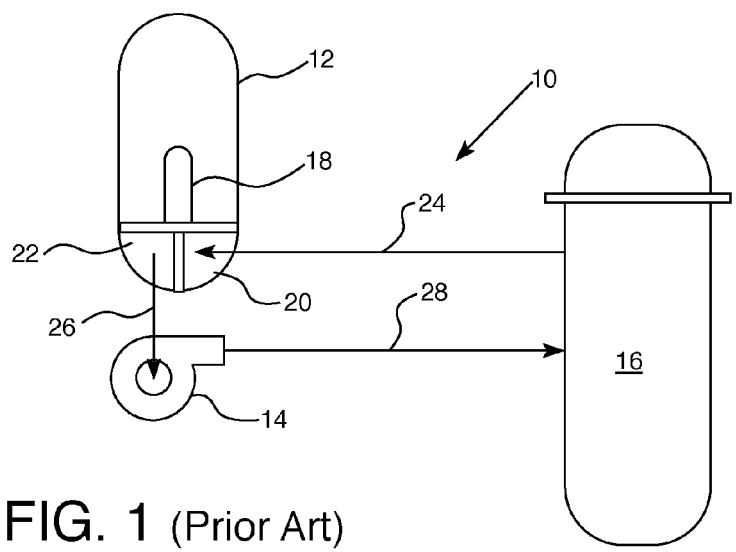
FIG. 1 is a schematic representation of one cooling loop of a conventional nuclear reactor cooling system which includes a steam generator and reactor coolant pump connected in series in a closed loop system with the reactor.

In the following description, like reference characters designate like or corresponding parts throughout the several view. Also, in the following description, it should be understood that such terms of direction as "forward," "rearward," "left," "right," "upwardly," "downwardly," and the like, are words of convenience and are not to be construed as limiting terms.

Prior Art Reactor Cooling Pump

To understand the invention, it is helpful to understand one environment in which the invention will operate. However, it should be appreciated that the invention has many other applications. Referring to FIG. 1, there is shown a schematic representation of one of a plurality of reactor coolant loops 10 of a conventional nuclear reactor coolant system. The coolant loop 10 includes a steam generator 12 and reactor coolant pump 14 connected in series in a closed loop coolant system with the nuclear reactor core 16. The steam generator 12 includes primary heat exchange tubes 18 communicating with inlet and outlet plenums 20, 22 of the steam generator 12. The inlet plenum 20 of the steam generator 12 is connected in flow communication with the outlet of the reactor core 16 for receiving hot coolant therefrom along the hot leg flow path 24, commonly referred to as the hot leg of the closed loop system. The outlet plenum 22 of the steam generator 12 is connected in flow communication with an inlet section side of the reactor coolant pump 14 along flow paths 26 of the closed loop system. The outlet pressure side of the reactor coolant pump 14 is connected in flow communication with the inlet of the reactor core 16 for feeding relatively cold coolant thereto along flow path 28 of the cold leg of the closed loop system.

The coolant pump 14 pumps the coolant under high pressure about the closed loop system. Particularly, hot coolant emanating from the reactor core 16 is conducted to the inlet plenum 20 of the steam generator 12 and through the heat exchange tubes 18 in communication therewith. While in the heat exchange tubes 18, the hot coolant flows in heat exchange relationship with cool feedwater supplied to the steam generator 12 via a conventional means (not shown). The feedwater is heated and portions thereof is changed to steam for use in driving a turbine generator (not shown). The coolant, whose temperature has been reduced by the heat exchange, is then recirculated to the reactor core 16 via the coolant pump 14.

The reactor coolant pump 14 must be capable of moving large volumes of reactor coolant at high temperatures and pressures about the closed loop system. Although, the temperature of the coolant flowing from the steam generator 12 through the pump 14 as a result of the heat exchange has been cooled substantially below the temperature of the coolant flowing to the steam generator 12 from the reactor core 16 before heat exchange, its temperature is still relatively high being typically about 550° F. (288° C.). To maintain the coolant in a liquid state at these relatively high temperatures, the system is pressurized by injection pumps (not shown) and operates at pressures that are approximately 2,250 psia (155 bar).

Figure 2:
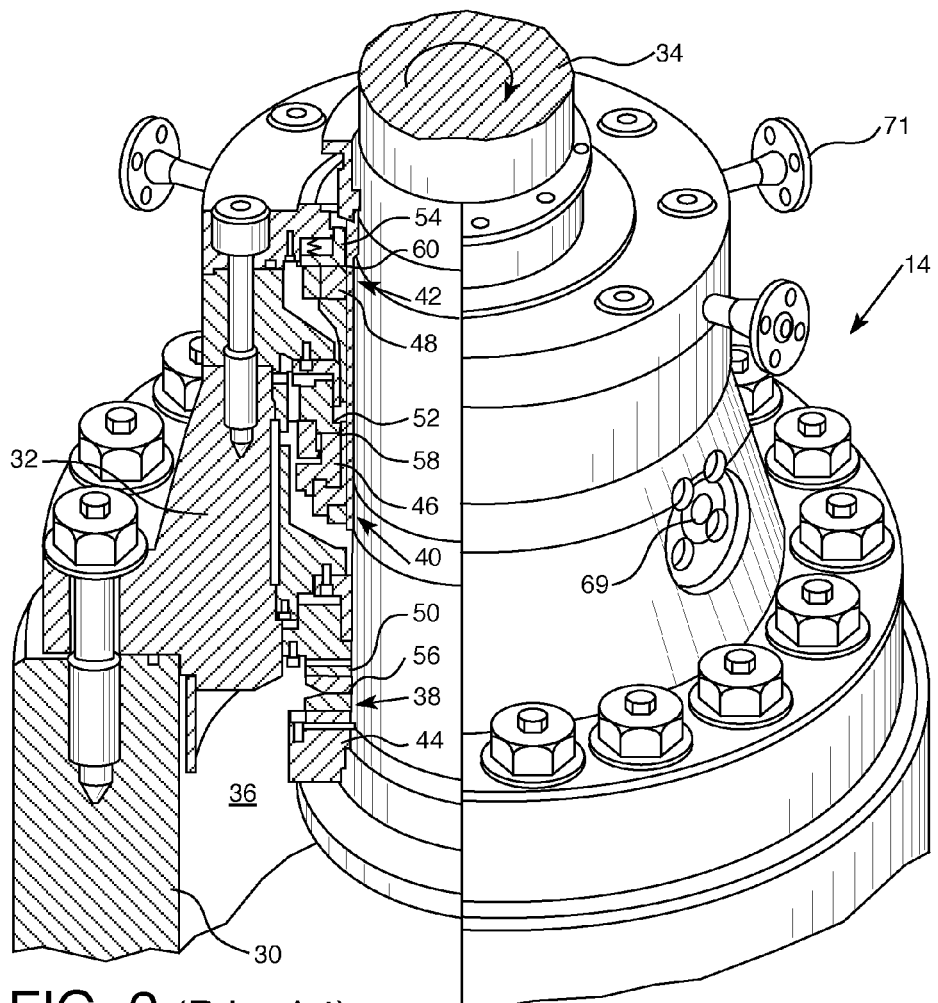
FIG. 2 is a cutaway perspective view of the shaft seal section of a reactor coolant pump, illustrating in cross section the seal housing and the lower primary, middle secondary, and upper tertiary seal assemblies which are disposed within the seal housing and surround the pump shaft.
Figure 3:
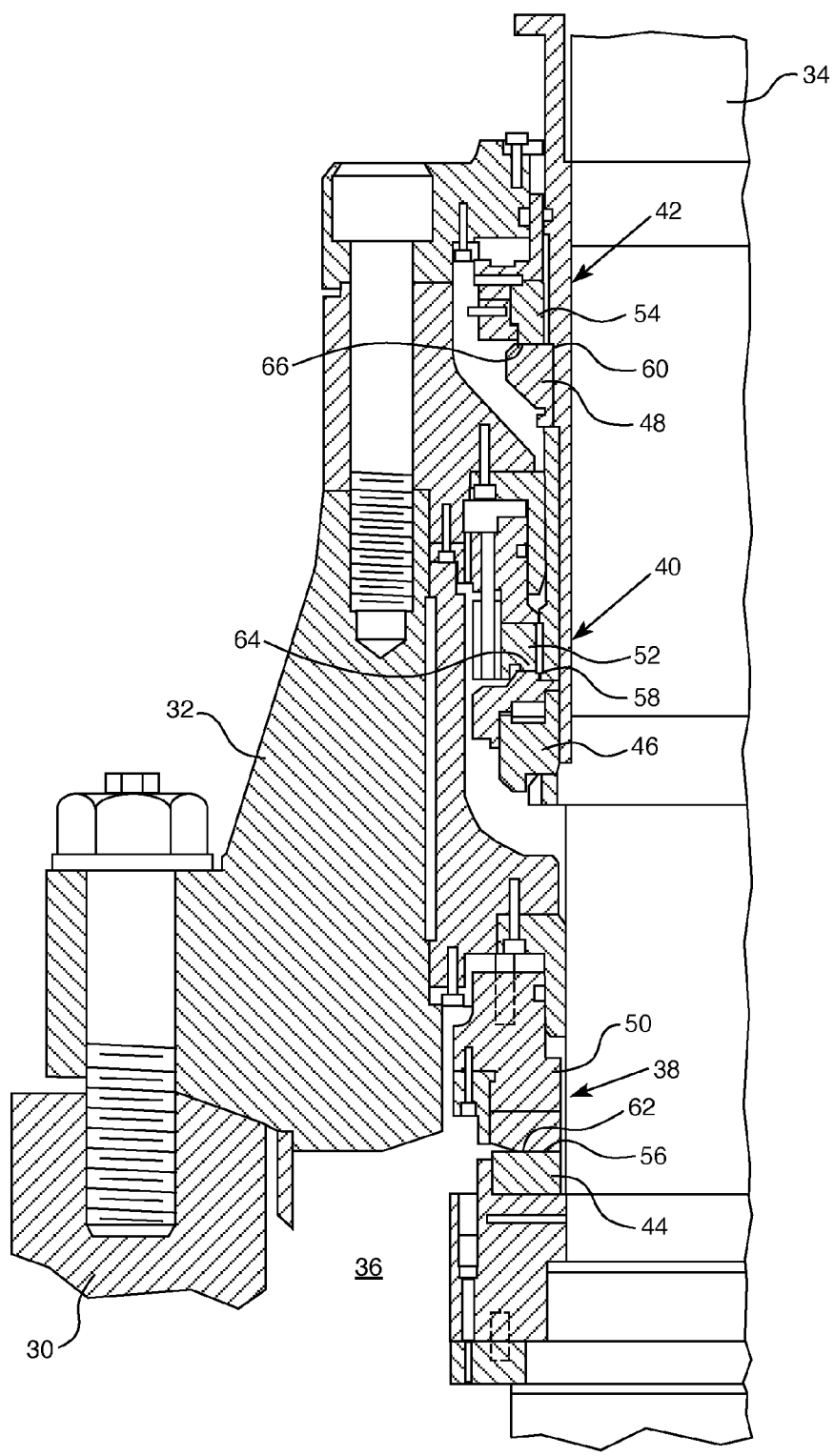
FIG. 3 is an enlarged cross sectional view of a portion of the seal housing and seal assemblies of the reactor coolant pump of FIG. 2.

As seen in FIGS. 2 and 3, the prior art reactor coolant pump 14 generally includes a pump housing 30 which terminates at one end in a seal housing 32. The pump also includes a pump shaft 34 extending centrally of the pump housing 30 and being sealed and rotatably mounted within the seal housing 32. Although not shown, the bottom portion of the pump shaft 34 is connected to an impeller, while a top portion thereof is connected to a high horsepower, induction type electric motor. When the motor rotates the shaft 34, the impeller within the interior 36 of the pump housing 30 causes the pressurized reactor coolant to flow through the reactor coolant system. This pressurized coolant applies an upwardly directed hydrostatic load upon the shaft 34 since the outer portion of the seal housing 32 is surrounded by the ambient atmosphere.

In order that the pump shaft 34 might rotate freely within the seal housing 32 while maintaining the 2,250 psia (155 bar) pressure boundary between the pump housing interior 36 and the outside of the seal housing 32, tandemly arranged lower primary, middle secondary and upper tertiary seal assemblies 38, 40, 42 are provided in the positions illustrated in FIGS. 2 and 3 about the pump shaft 34 within the seal housing 32. The lower primary seal 38 which performs most of the pressure sealing (approximately 2,200 psi (152 bar)) is of the non-contacting hydrostatic type, whereas the middle secondary and upper tertiary seal assemblies 40, 42 are of the contacting or rubbing mechanical type.

Each of the seal assemblies 38, 40, 42 of the pump 14 generally includes a respective annular runner 44, 46, 48 which is mounted to the pump shaft 34 for rotation therewith and a respective annular seal ring 50, 52, 54 which is stationarally mounted within the seal housing 32. The respective runners 44, 46, 48 and the seal rings 50, 52, 54 have top and bottom surfaces 56, 58, 60 and 62, 64, 66 which face one another. The facing surfaces 56, 62 of the runner 44 and seal ring 50 of the lower primary sealing assembly 38 normally do not contact one another but instead a film of fluid normally flows between them. On the other hand, the face surfaces 58, 64 and 60, 66 of the runners and seal rings 46, 52 and 48, 54 of the middle secondary and upper tertiary seal assemblies 40 and 42 normally contact or rub against one another.

Because the primary sealing assembly 38 normally operates in a film-riding mode, some provision must be made for handling cooling fluid which "leaks off" in the space between the annular wall 33 of the seal housing 32 and the shaft 34 rotatably mounted thereto. Accordingly, as shown in FIG. 2, the seal housing 32 includes a primary leak-off port 69, whereas leak-off ports 71 accommodate coolant fluid leak-off from the secondary and tertiary seal assemblies 40, 42.

Figure 4:
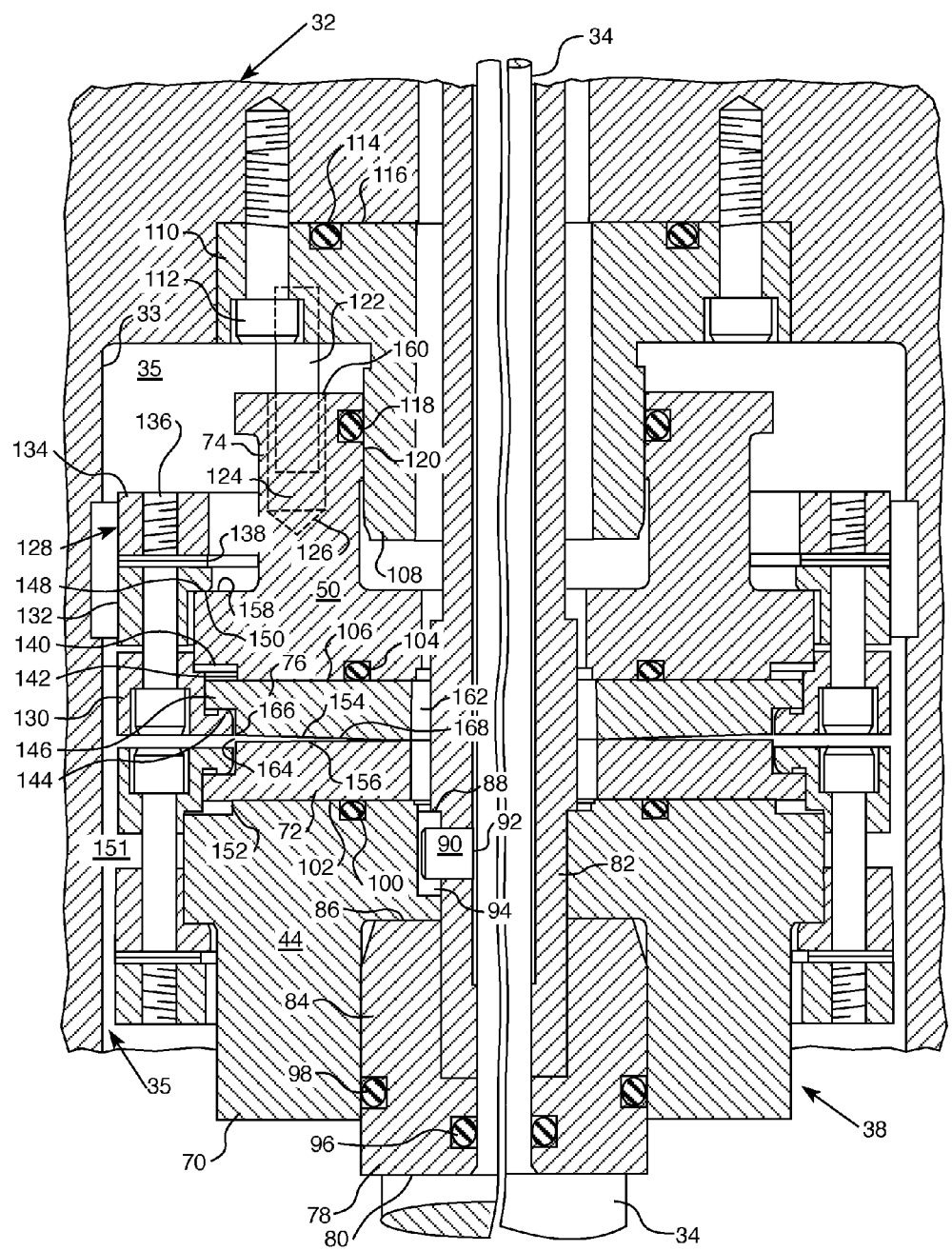
FIG. 4 is a sectional view of the shaft seal arrangement showing an enlarged view of the lower primary seal shown in FIGS. 2 and 3, to which this invention may be applied.

FIG. 4 is a cross section of the seal housing in the area of the number 1 seal or primary lower seal of the type illustrated in FIGS. 2 and 3 and provides a better understanding of the operation of the number 1 seal and how it will interface with this invention. The structure shown comprises a housing 32 having annular wall 33 adapted to form a pressure chamber 35 within the housing 32; a shaft 34 rotatably mounted within the housing 32; a seal runner assembly 44 and a seal ring assembly 50 disposed within the housing 32. As previously mentioned, the shaft 34 may be driven by a suitable motor (not shown) and utilized to drive the impeller of a centrifugal pump (not shown) which circulates the coolant in the pressurized system. Injection water may be supplied to the chamber 35 at a higher pressure than that developed by the pump. The runner assembly 44 comprises an annular holder 70 and an annular seal plate 72. Similarly, the seal ring assembly 50 comprises a holder 74 and an annular face plate 76.

The holder 70 rotates with the shaft 34 since it is mounted on an annular support 78 which engages a shoulder 80 on the shaft 34 and is secured to the shaft by means of a sleeve 82 which is assembled onto the shaft 34 between the shaft and an upwardly extending leg 84 of the support 78 which is generally L-shaped in cross section. It should be appreciated that although this embodiment of the invention is being described as applied to a pump that employs a sleeve over the pump shaft, the invention can be employed equally as well on pump shafts that do not employ sleeves. A shoulder 86 on the holder 70 rests on the upper end of the leg 84, and a shoulder 88 on the sleeve 82 retains the holder 70 on the support 84. A pin 90 is pressed into a recess 92 in the sleeve 82 and engages an axial slot 94 in the holder 70. An axial clamping force is exerted on the sleeve 82 and the support 78 from a nut (not shown) which causes the sleeve 82 and the support 78 to rotate with the shaft 34. The pin 90, in turn, causes the holder 70 to rotate with the sleeve 82 which rotates with the shaft 34. O-ring seals 96 and 98 are provided between the support 78 and the shaft 34 and the holder 70, respectively. An O-ring seal 100 is also provided in the interface 102 between the holder 70 and the seal plate 72.

The seal plate 72 is composed of a corrosion and erosion resistant material having substantially the same coefficient of thermal expansion as the material of which the holder 70 is composed, and the holder 70 has a high elastic modulus. Similarly, the face plate 76 is composed of a corrosion and erosion resistant material having substantially the same coefficient of thermal expansion as the material of the holder 74 which has a high elastic modulus. Examples of suitable materials are carbides and ceramics. An O-ring seal 104 is provided in the interface 106 between the holder 74 and the face plate 76.

The holder 74 is movably mounted on a downwardly extending leg 108 of an annular seal ring insert 110 which is generally L-shaped in cross section. The insert 110 is retained in the housing 32 by cap screws 112. An O-ring seal 114 is provided in the interface between the insert 110 and the housing 32. Similarly, O-ring seal 118 is provided in the interface 120 between the holder 74 and the leg 108 of the insert 110. Rotative movement of the holder 74 is prevented by the pin 122 which is pressed into the insert 110. The pin 122 extends into a well 124 in the holder 74 with sufficient clearance between the wall of the well 126 and the pin 122 to permit axial movement of the holder 74 but limit rotative movement of the holder 74.

The face plate 76 is attached to the holder 74 by clamping means 128 which includes a retainer ring 130, a clamp ring 132, a lock ring 134, a plurality of cap screws 136 and belleville springs 138 mounted on the cap screw 136 between the lock ring 134 and the clamp ring 132. The cap screws 136 extend through the retainer ring 130, the clamp ring 132, and the belleville springs 138 and are threaded into the lock rings 134. The interface 106 of the holder 74 is recessed at 140 to provide an annular fulcrum 142 on the interface at an outside diameter which is less than the outside diameter of the interface of the face plate 76. The retainer ring 130 has an inwardly extending flange with a ridge 144 which engages the portion 146 of the face plate 76 extending beyond the fulcrum 142. The clamp ring 132 has an inwardly extending flange with a ridge 148 which engages a face plate 146 on the holder 74. Thus, when the cap screws 136 are tightened to draw the clamp ring 132 and the retainer ring 130 towards each other, a force is produced which exerts a cantilever effect on the face plate 76 about the fulcrum 142. During the clamping action, the belleville springs 138 are partly compressed and the face plate 76 is deformed by the clamping force.

The seal plate 72 is attached to the holder 70 by a clamping means 151 in a manner similar to that described with reference to the face plate 76. However, the fulcrum 152 on the interface 102 of the holder 70 is located closer to the outside diameter of the seal plate 72 than is the fulcrum 142 on the holder 74. Thus, the clamping force on the seal plate 72 does not produce as much deformation of the face plate about the fulcrum 152 as is produced on the face plate 76. If desired, the fulcrums 142 and 152 may be placed at the same locations with respect to their corresponding face plates.

As previously described, the seal ring 50 is mounted for limited axial movement relative the shaft 34 and the seal runner assembly 44. Also, rotative movement of the seal ring assembly 50 is limited by the anti-rotational pin 122 which fits loosely in the well 124 in the seal ring holder 74. A seal face 154 on the face plate 76 is biased toward the confronting seal face 156 on the seal plate 72 by gravity.

In operation of the pump driven by the shaft 34, surfaces 158 and 160 of the seal ring holder 74 are subjected to the full pressure in the high pressure chamber 35. It is desirable to provide a pressure barrier between the high pressure chamber 35 and an annular low pressure region 162 adjacent the sleeve 82. The seal ring assembly is utilized as the pressure barrier means, but permits a controlled amount of fluid leakage flow to the region 162 from the pressure chamber 35 through a seal gap 164 provided between the confronting seal surfaces 154 and 156 on the seal plates 76 and 72, respectively.

During operation, a balanced or equilibrium position of the axially moveable seal ring assembly 50 is maintained in accordance with the pressure on opposing faces of the seal ring assembly. The thickness of the fluid in the gap 164 and, consequently, the amount of leakage flow through the gap 164 is determined by the configuration of the gap 164.

In order to obtain a self-restoration of the relative position of the seal ring assembly 50 and the runner assembly 44 upon a variation in the seal gap 164, a fluid flow path of decreasing thickness is provided from a high pressure edge or extremity 166 to a position between the seal faced extremities. More specifically, in the structure illustrated, the fluid flow path of decreasing thickness extends between the outer edge 166 and an intermediate concentric circle located at 168 on the sealing face 154.

As shown in the present structure, the decreasing flow path thickness is formed by tapering the surface 154 slightly away from the confronting surface 156 of the face on seal plate 72 between the circle 168 and the outer edge 166 of the face plate 76. The angle between the surfaces 154 and 156 shown in the drawing is exaggerated. This configuration or structure is known as a tapered-face seal. The operation of a seal of this type is fully described in U.S. Pat. No. 3,347,552, issued Oct. 17, 1967 to Erling Frisch.

Accordingly, reactor coolant pumps and similar machines utilizing rotating shafts to transfer mechanical energy between a driver such as a motor and a process fluid require the use of shaft seals, like that described above, to isolate the process fluid along the shaft as the shaft penetrates the process boundary. Hydrostatic, balanced mechanical face seals are commonly used for this application, particularly in cases that require high reliability, controlled leakage, and limited wear. Such seals utilize two interfacing members, one of which is secured to the rotating shaft while the other is secured to the stationary housing. Each member has a precisely-designed "seal face" that interface with one another at a small axial clearance such that the faces do not contact one another but leakage is controlled to a manageable level.

The Improved Seal of this Invention

Figure 5:
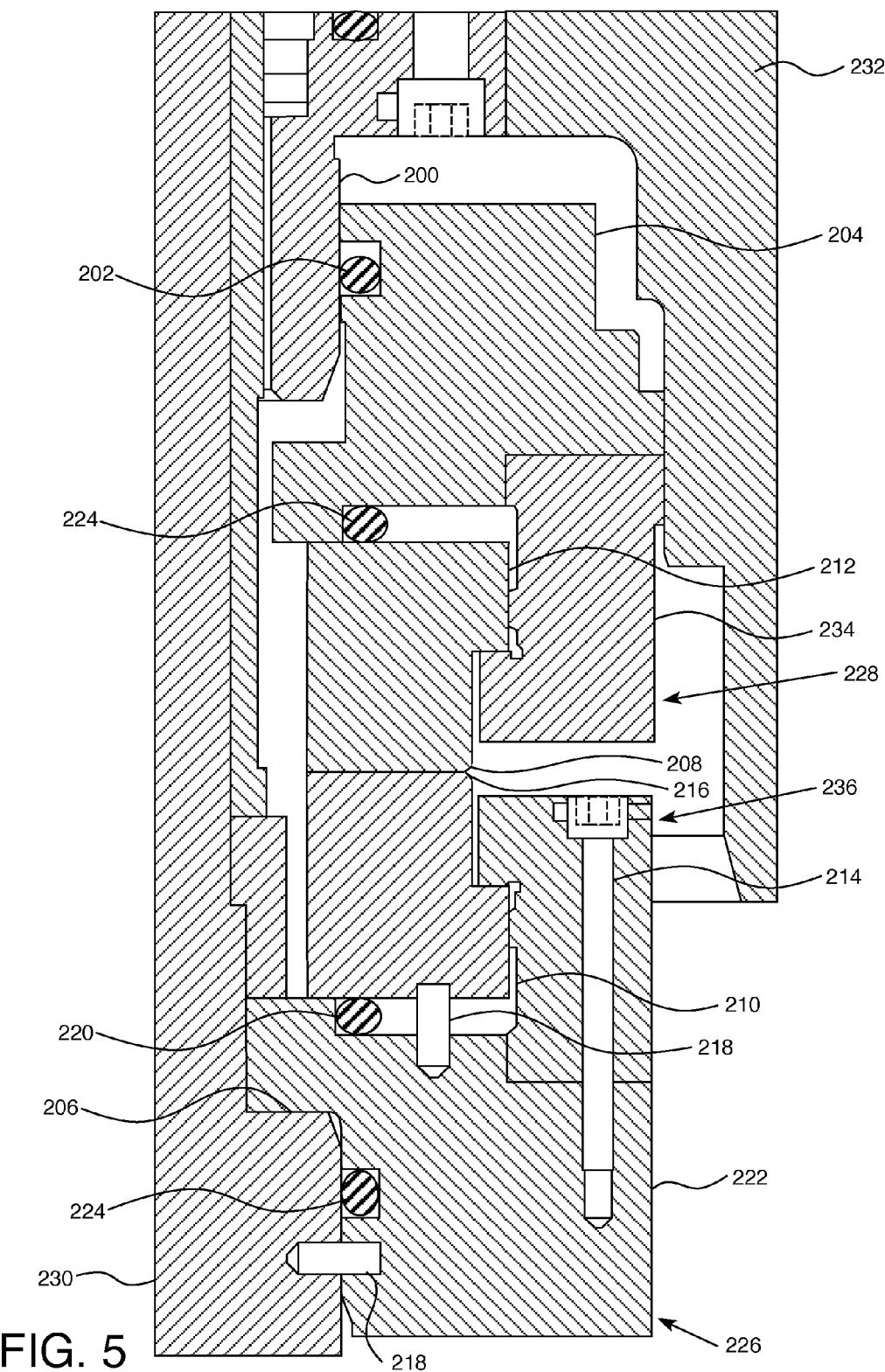
FIG. 5 is a schematic view of the shaft seal of this invention.

As shown in FIG. 5, the seal of this invention also employs two opposing assemblies: a rotating assembly 226 is secured to the pump shaft 230 and a stationary assembly 228 is secured to the housing 232. Each assembly comprises a ceramic seal face plate 210, 212 supported by a base support ring 204, 222 and support shroud 234, 236. The process fluid of the pump is on the outside surface of the seal and the inside surfaces are connected to the low pressure bleed off system. Leakage passes through the axial gap between the seal faces from outside diameter to inside diameter, and the pressure is reduced along the way from the pressure of the process fluid to the pressure of the bleed off system.

To accommodate axial motion of the pump shaft 230 relative to the housing 232, such as that which may occur due to mechanical excitation or differential thermal expansion, the stationary assembly 228 is unconstrained in the axial direction and may translate freely. The axial position of the stationary assembly 228 with respect to the rotating assembly 226 is established by the balance of forces acting on the stationary assembly. The pressure of the process fluid acts on the top surface of the stationary assembly 228 outside of the dynamic O-ring 202, and the pressure of the bleed off system acts on the top surface of the stationary assembly 228 inside of the dynamic O-ring 202. The net hydrostatic force resulting from these pressures and the weight of the stationary assembly 228 acts to push the stationary assembly towards the rotating assembly 226. Opposing this force, the distribution of pressure between the faces of the stationary and rotating assemblies act to push the stationary assembly 228 away from the rotating assembly 226. The shape of the fluid pressure distribution between the seal faces 208, 216 is nonlinear and dependent upon the geometry of the flow path between the stationary and rotating assemblies. Accordingly, the shape of the pressure distribution changes as the stationary assembly 228 moves further away or closer towards the rotating assembly 226. As the stationary assembly 228 moves further away from the rotating assembly 226, the pressure distribution becomes more linear and the resulting hydrostatic force decreases. On the other hand, as the stationary assembly 228 moves closer towards the rotating assembly 226, the pressure distribution becomes flatter and the resulting hydrostatic force increases. This behavior is referred to as "load support" and causes the seal to maintain a stable, finite clearance between the seal faces 208, 216 irrespective of externally applied loads. The seal, therefore, maintains a constant axial clearance such that the faces do not touch, wear is minimal, and the leakage rate is relatively constant.

The axial position of the seal faces 208, 216 is established by support rings 204, 222. The support ring 222 for the rotating assembly attaches to the pump shaft 230, and its axial position is established by a shoulder 206 on the shaft. Torque is transmitted between the support ring 222 and the shaft 230 by one or more keys or screws 218 that engage a compatible slot on the support ring 222. The support ring 222 accepts an O-ring 224 that interfaces with the pump shaft 230 and forms a static sealed joint between the high pressure and low pressure sides of the seal. The support ring 222 also accepts an O-ring 220 on the top face of the lower support ring 222 that forms a static sealed joint between the top of the support ring 222 and the bottom of the face plate 210 between the high and low pressure sides of the seal. The radial position of the O-ring 220 is selected such that the difference in force resulting from the hydrostatic pressure on the film surface 216 of the face plate 210 is greater than the force resulting from the hydrostatic pressure on the bottom surface of the face plate 210. The net force causes the face plate 210 to be firmly held against the support ring 222. The radial position of the O-ring is also selected, in conjunction with the shape of the film surface 216 geometry, such that the net moment acting upon the face plate 210 yields an acceptable angular deformation of the face plate about the face plate centroid in order maintain the desired interface geometry of the fluid film passing between the seal faces 208 and 216. The support ring 222 also accepts one or more drive pins 218 that are used for torque transmission between the support ring 222 and face plate 210, such that relative rotation between the shaft 230, support ring 222, and face plate 210 is not permitted.

The support ring 204 for the stationary assembly 228 holds the stationary assembly face plate 212 in alignment with the rotating assembly 226 and accepts a dynamic O-ring seal 202 that breaks down the pressure between the high pressure and the low pressure sides of the seal along the sliding interface between the stationary assembly 228 and housing insert 200. The stationary assembly support ring 204 also accepts an O-ring 224 on its face adjacent to the face plate 212, and in the same way as the rotating assembly support ring 222, the radial position of the O-ring 224 is selected such that the difference in force resulting from the hydrostatic pressure on the film surface 208 of the face plate 212 is greater than the force resulting from the hydrostatic pressure on the back surface of the face plate 212. As such, the stationary assembly face plate 212 is held into firm contact with the stationary assembly support ring 204. The radial position of the O-ring 224 is also selected, in conjunction with the shape of the film surface geometry of the sealing surface 208, such that the net moment acting upon the face plate 212 yields an acceptable angular deformation of the face plate 212 about the face plate centroid in order to maintain the desired interface geometry of the fluid film passing between the seal faces 208 and 216. The stationary assembly support ring 204 also accepts one or more pins (such as the pins 218 in the rotating assembly 226) that prevent relative rotation between the stationary assembly face plate 212 and stationary assembly support ring 204.

Both the rotating assembly 226 and the stationary assembly 228 have support shrouds 234, 236 that are fixed to the support rings 204, 222 with mechanical fasteners 214. The support shrouds 234, 236 serve to provide radial centering of their respective face plates 212, 210, to hold the face plates 212, 210 onto the support rings 204, 222 for assembly and startup, to provide initial compression of the face plate O-rings 224, 220, and provide a thermal barrier to protect the outside surfaces of the face plates 212, 210 from rapid changes in temperature of the process fluid and the consequential thermoelastic distortion that may alter the seal geometry and leakage rate. The support shrouds 234, 236 are sized such that, during normal operation, a small axial clearance exists between the corresponding shoulder on the face plate 212, 210 and the inside face of the support shroud 234, 236.

Figure 6:
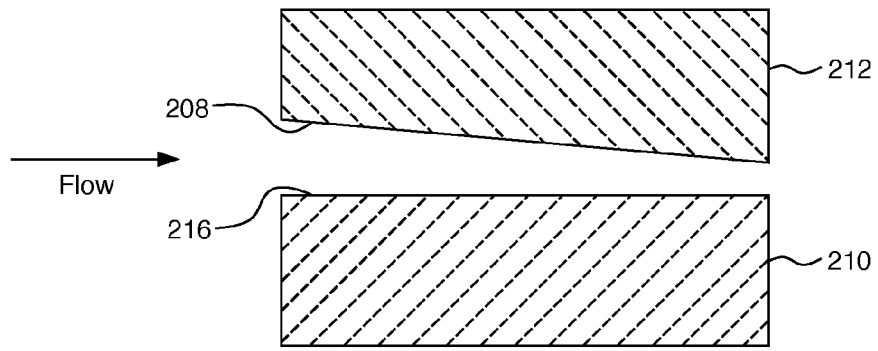
FIG. 6 is a schematic view of a tapered seal face of one embodiment of this invention.
Figure 7:
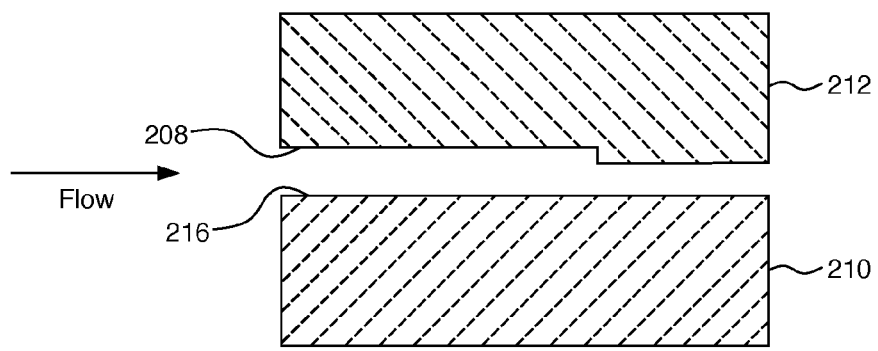
FIG. 7 is a schematic view of a stepped seal face of a second embodiment of this invention.
Figure 8:
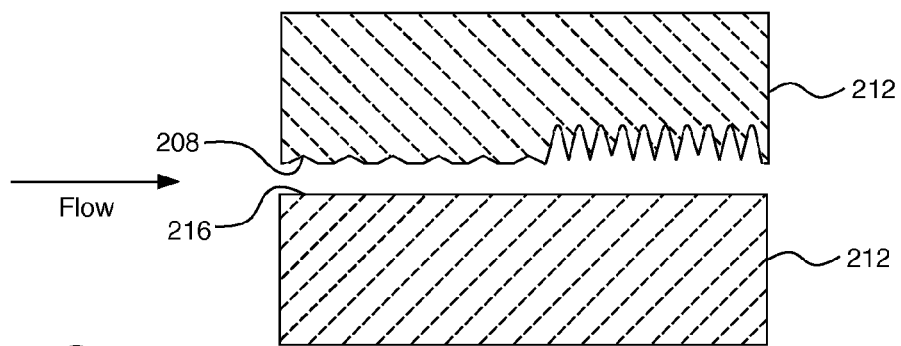
FIG. 8 is a schematic view of a seal face with a non-uniform contour of a third embodiment of this invention.

The shape of the face plates 212, 210 is selected such that the net moment resulting from pressure, mechanical and thermal loads produces a slight axis-symmetric deflection that brings the outside edges of the film surfaces 208, 216 of the stationary and rotating assemblies' face plates 212, 210 to a closer axial distance. The stationary face plate 212 has a contoured surface 208 that is axisymmetric but non-uniform in the radial direction. The surface contour creates a nonlinear pressure distribution between the face plates 212, 210 that creates load support as discussed above. The preferred embodiment described herein utilizes a tapered surface 208 on the stationary assembly face plate 212 that yields a convergent angle between the stationary and rotating assembly face plates 212, 210 with the largest axial clearance at the outside diameter and the smallest axial clearance at the inside diameter as shown in FIG. 6. Alternate embodiments of the invention can be realized by utilizing a stepped surface as shown in FIG. 7 or non-uniform surface texturing as shown in FIG. 8 in lieu of or in combination with a tapered film surface. Since the face plates 212, 210 are designed to allow a slight torsional deflection, the magnitude of the converging angle changes in response to the differences in pressure and temperature between the process and bleed off sides of the seal. The designer can tune the shape of the face plate 212, 210 and surface contour to achieve a seal leakage rate, temperature rise, and pressure-flow relationship suitable for the particular application.

The improved hydrostatic, mechanical face seal of this invention represents a departure from existing technology primarily in the method with which the ceramic seal face plates 212, 210 are supported, oriented and attached to the rotating and stationary assemblies. The existing design employs a "clamp ring" which exerts a mechanical clamping force on the ceramic face plate. The mechanical clamping force is due to preload from mechanical fasteners and a hydrostatic force generated by a differential area sealed between two O-rings which is ported to the low pressure side of the seal. The clamp ring serves to hold the face plate to the base and to control radial taper distortion due to the unequal distribution of pressures around the face plate's perimeter. The existing arrangement is problematic because the clamping force exerted on the face plate causes waviness and high friction loading and also causes a significant sensitivity associated with the compression, friction, and time-dependent behavior of the O-rings in the hydrostatic clamp ring. These effects cause the seal to react in potentially unpredictable ways.

The improved design eliminates the hydrostatic clamp ring and replaces it with a support shroud that serves to secure the face plate to the base during assembly and startup. Whereas the existing design relies on contact with the hydrostatic clamp ring to secure the face plate to the base and control radial taper during all modes of operation, the improved design is such that, during normal operation, the face plate does not contact the support shroud. This approach eliminates the potential waviness, friction loading, and O-ring sensitivity associated with the hydrostatic clamp ring. To eliminate the mechanical clamping force, the improved seal has been designed such that the hydrostatic forces alone secure the face plate to the support ring and control radial taper. This is achieved by positioning the O-rings between the face plate and the support ring within the design such that the hydrostatic force acting on the film surface of the face plates is slightly greater than the hydrostatic force acting on the back of the face plates. The resultant axial force creates a net load that secures the face plate to the support ring without any mechanical clamping mechanism or fasteners. Radial taper control is accomplished by designing the cross section and face topography of the face plates in such a way that the applied hydrostatic forces generate the desired torsional moment about the face plate cross-sectional centroid, such that, as the differential pressure increases, the net converging radial taper between the seal faces decreases. The seal leak rate and pressure-flow relationship can be tuned by the designer by modifying the backup O-ring position, face topography design, and shape of the seal face in order to achieve a seal leakage rate suitable for the particular application.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A pump comprising:
   a rotatable shaft having an axial length;
   a housing having an annular interior wall that surrounds and is spaced from at least a portion of the axial length of the rotatable shaft;
   a first seal support ring having a face on either side with the first seal support ring fixedly attached to, extending around and rotatable with the rotatable shaft, the first seal support ring having an axially extending first boss on one face of the first seal support ring at or proximate a radial inner end adjacent the rotatable shaft, and an axially extending, annular shroud at or proximate an outer end of the one face of the first seal support ring, with a lip at or near a peripheral axial end of the first seal support ring shroud extending toward the rotatable shaft, with an annular, first recess in the one face of the first seal support ring extending between the first boss and the first seal support ring shroud;
   a first face plate supported at one end, opposing the one face on the first seal support ring, on at least a portion of the first boss, spaced from the rotatable shaft, with the one end of the first face plate substantially spanning the first recess and having a radially extending ledge on an outer side that fits under the lip on the first seal support ring shroud, with a first land on either an inner wall on the shroud of the first seal support ring or the outer side of the first face plate, below and spaced from the lip, that forms a standoff between the shroud on the first seal support ring and the first face plate, the first face plate having another end, axially opposite the one end that forms a first sealing surface, with the first sealing surface extending axially past the lip on the first seal support ring shroud and the first face plate extending around and rotatable with the rotatable shaft, wherein the shroud on the first seal support ring is configured to limit radial outward movement of the first face plate without applying an axial clamping force on the first sealing surface during pump operation;
   a second seal support ring having a face on either side, with the second seal support ring secured to an interior of the housing with a degree of freedom of axial movement and spaced from and extending at least partially around the rotatable shaft, the second seal support ring having an axially extending second boss on one face of the second seal support ring at or proximate a radial inner end adjacent the rotatable shaft, and an axially extending, annular shroud at or proximate an outer end of the one face of the second seal support ring with a lip at or near a peripheral axial end of the second seal support ring shroud extending toward the rotatable shaft, with a second annular recess in the one face of the second seal support ring extending between the second boss and the second seal support ring shroud; and
   a second face plate supported at one end, opposing the one face on the second seal support ring, on at least a portion of the second boss, spaced from the rotatable shaft, with the one end of the second face plate substantially spanning the second recess and having a radially extending ledge on an outer side of the second face plate that fits under the lip on the second seal support ring shroud with a second land on either an inner wall on the shroud of the second seal support ring or the outer side of the second face plate, below and spaced from the lip on the second seal support ring shroud, that forms a standoff between the shroud on the second seal support ring and the second face plate, the second face plate having another end, axially opposite the one end on the second face plate, that forms a second sealing surface, with the second sealing surface extending axially past the lip on the shroud of the second seal support ring, juxtaposed to the first sealing surface and the second face plate extending substantially around and spaced from the rotatable shaft, wherein the shroud on the second seal support ring is configured to limit radial outward movement of the second face plate without applying an axial clamping force on the second sealing surface during pump operation.

2. The pump of claim 1 wherein at least one of the first sealing surface and the second sealing surface is configured to have a contoured surface that is axis-symmetric but non-uniform in a radial direction to create a nonlinear pressure distribution between the first sealing surface and the second sealing surface.

3. The pump of claim 1 wherein the second face plate has the second sealing surface with the contoured surface that is axis-symmetric but non-uniform in a radial direction to create a nonlinear pressure distribution between the first sealing surface and the second sealing surface.

4. The pump of claim 1 wherein the at least one of the first sealing surface and the second sealing surface is a tapered surface that yields a convergent angle between the first sealing surface and the second sealing surface with the largest axial clearance at the outside diameter and the smallest axial clearance at the inside diameter.

5. The pump of claim 4 wherein the at least one of the first sealing surface and the second sealing surface has a stepped or non-uniform texture surface.

6. The pump of claim 1 wherein the at least one of the first sealing surface and the second sealing surface has a stepped or non-uniform texture surface.

7. The pump of claim 1 including a first O-ring around an outside surface of the first boss at an interface of the first boss with the one end of the first face plate.

8. The pump of claim 7 wherein while the radially extending ledge on the first face plate fits under the lip on the first seal support ring shroud, during operation of the pump the first seal support ring and the first face plate are configured so substantially no mechanical force is applied to the first face plate to hold the first face plate against the first seal support ring and during pump operation the radially extending ledge does not contact the lip on the first seal support ring shroud.

9. The pump of claim 7 including a second O-ring around an outside surface of the second boss at an interface of the second boss with the one end of the second face plate.

10. The pump of claim 9 wherein the first seal support ring comprises a first groove that surrounds the rotatable shaft and a third O-ring surrounds the rotatable shaft within the first groove and forms a seal between the first seal support ring and the rotatable shaft; and the second seal support ring comprises a second groove that surrounds a portion of the housing adjacent the rotatable shaft and a fourth O-ring surrounds the portion of the housing, within the second groove, between the second seal support ring and the portion of the housing and forms a seal between the second seal support ring and the portion of the housing.

11. A hydrostatic mechanical face seal comprising:
a first seal support ring having a face on either side with the first seal support ring configured to fixedly attached to, extend around and rotate with a rotatable shaft that, aside from some controlled leakage, the hydrostatic mechanical seal is intended to substantially isolate from a process fluid on an outer surface of the first seal support ring, the first seal support ring having an axially extending first boss on one face of the first seal support ring at or proximate a radial inner end adjacent the rotatable shaft, and an axially extending, annular shroud at or proximate an outer end of the one face of the first seal support ring, with a lip at or near a peripheral axial end of the first seal support ring shroud extending toward the rotatable shaft, with an annular, first recess in the one face of the first seal support ring extending between the first boss and the first seal support ring shroud;

a first face plate supported at one end, opposing the one face on the first seal support ring, on at least a portion of the first boss, spaced from the rotatable shaft, with the one end of the first face plate substantially spanning the first recess and having a radially extending ledge on an outer side that fits under the lip on the first seal support ring shroud, with a first land on either an inner wall on the shroud of the first seal support ring or the outer side of the first face plate, below and spaced from the lip, that forms a standoff between the shroud on the first seal support ring and the first face plate, the first face plate having another end, axially opposite the one end that forms a first sealing surface, with the first sealing surface extending axially past the lip on the first seal support ring shroud and the first face plate configured to extend around and rotate with the rotatable shaft, wherein the shroud on the first seal support ring is configured to limit radial outward movement of the first face plate without applying an axial clamping force on the first sealing surface during operation of a pump in which the hydrostatic mechanical face seal is installed;

a second seal support ring having a face on either side, with the second seal support ring configured to be secured to an interior of a housing that surrounds a length of the rotatable shaft, with a degree of freedom of axial movement and spaced from and extending at least partially around the rotatable shaft, the second seal support ring having an axially extending second boss on one face of the second seal support ring at or proximate a radial inner end adjacent the rotatable shaft, and an axially extending, annular shroud at or proximate an outer end of the one face of the second seal support ring with a lip at or near a peripheral axial end of the second seal support ring shroud extending toward the rotatable shaft, with a second annular recess in the one face of the second seal support ring extending between the second boss and the second seal support ring shroud; and a second face plate supported at one end, opposing the one face on the second seal support ring, on at least a portion of the second boss, spaced from the rotatable shaft, with the one end of the second face plate substantially spanning the second recess and having a radially extending ledge on an outer side of the second face plate that fits under the lip on the second seal support ring shroud with a second land on either an inner wall on the shroud of the second seal support ring or the outer side of the second face plate, below and spaced from the lip on the second seal support ring shroud, that forms a standoff between the shroud on the second seal support ring and the second face plate, the second face plate having another end, axially opposite the one end on the second face plate, that forms a second sealing surface, with the second sealing surface extending axially past the lip on the shroud of the second seal support ring, juxtaposed to the first sealing surface, and the second face plate configured to extend substantially around and be spaced from the rotatable shaft, wherein the shroud on the second seal support ring is configured to limit radial outward movement of the second face plate without applying an axial clamping force on the second sealing surface during operation of a pump in which the hydrostatic mechanical face seal is installed.

12. The hydrostatic mechanical face seal of claim 11 wherein at least one of the first sealing surface and the second sealing surface is configured to have a contoured surface that is axis-symmetric but non-uniform in a radial direction to create a nonlinear pressure distribution between the first sealing surface and the second sealing surface.

13. The hydrostatic mechanical face seal of claim 11 wherein the second face plate has the second sealing surface with the contoured surface that is axis-symmetric but non-uniform in a radial direction to create a nonlinear pressure distribution between the first sealing surface and the second sealing surface.

14. The hydrostatic mechanical face seal of claim 11 wherein the at least one of the first sealing surface and the second sealing surface is a tapered surface that yields a convergent angle between the first sealing surface and the second sealing surface with the largest axial clearance at the outside diameter and the smallest axial clearance at the inside diameter.

15. The hydrostatic mechanical face seal of claim 14 wherein the at least one of the first sealing surface and the second sealing surface has a stepped or non-uniform texture surface.

16. The hydrostatic mechanical face seal of claim 11 wherein the at least one of the first sealing surface and the second sealing surface has a stepped or non-uniform texture surface.

17. The hydrostatic mechanical face seal of claim 11 including a first O-ring around an outside surface of the first boss at an interface of the first boss with the one end of the first face plate.

18. The hydrostatic mechanical face seal of claim 17 wherein while the radially extending ledge on the first face plate fits under the lip on the first seal support ring shroud, during operation of the pump the first seal support ring and the first face plate are configured so substantially no mechanical force is applied to the first face plate to hold the first face plate against the first seal support ring and during pump operation the radially extending ledge does not contact the lip on the first seal support ring shroud.

19. The hydrostatic mechanical face seal of claim 17 including a second O-ring around an outside surface of the second boss at an interface of the second boss with the one end of the second face plate.

20. The hydrostatic mechanical face seal of claim 19 wherein the first seal support ring comprises a first groove configured to surround the rotatable shaft and a third O-ring is configured to surround the rotatable shaft within the first groove and form a seal between the first seal support ring and the rotatable shaft; and the second seal support ring comprises a second groove that is configured to surround a portion of the housing adjacent the rotatable shaft and a fourth O-ring is configured to surround the portion of the housing within the second groove, between the second seal support ring and the portion of the housing and forms a seal between the second seal support ring and the portion of the housing.

21. A controlled leakage hydrostatic mechanical face seal comprising:
   a first seal support ring configured to be secured to a rotating shaft of a pump to rotate with the rotating shaft, the shaft having an axial length;
   a first face plate supported on one side of the first seal support ring and having a sealing surface on an opposite side of the first face plate;
   a second seal support ring configured to be secured to an inside of a housing surrounding the rotating shaft, with a degree of axial movement;
   a second face plate supported on one side of the second seal support ring and having a second sealing surface on an opposite side of the second face plate, wherein the second sealing surface is positioned juxtaposed to the first sealing surface; and
   wherein a first interface between the first seal support ring and the first face plate and a second interface between the second seal support ring and the second face plate are configured so that during operation of the pump the hydrostatic forces on the first sealing surface and the second sealing surface are sufficient to hold the first face plate against the first seal support ring and the second face plate against the second seal support ring with a controlled leakage path between the first sealing surface and the second sealing surface, without any mechanical force applied to the first face plate or the second face plate during operation of a pump in which the hydrostatic mechanical face seal is installed.

* * * * *